(12) United States Patent
Herrell et al.

(10) Patent No.: US 8,300,099 B2
(45) Date of Patent: Oct. 30, 2012

(54) FOUR-SIDED PHOTOGRAPHY CAMERA

(76) Inventors: Stephanie Herrell, Peru, IN (US); Jason Herrell, Peru, IN (US)

(*) Notice: Subject to any disclaimer, the term of this patent is extended or adjusted under 35 U.S.C. 154(b) by 569 days.

(21) Appl. No.: 12/497,549

(22) Filed: Jul. 3, 2009

(65) Prior Publication Data

US 2011/0001834 A1  Jan. 6, 2011

(51) Int. Cl.
*H04N 7/18* (2006.01)
*H04N 5/232* (2006.01)

(52) U.S. Cl. .................. 348/143; 348/211.3; 348/151

(58) Field of Classification Search .............. 348/143, 348/149, 151, 152, 211.8, 211.3
See application file for complete search history.

(56) References Cited

U.S. PATENT DOCUMENTS

| | | | | |
|---|---|---|---|---|
| 4,214,821 A | * | 7/1980 | Termes | 352/70 |
| 5,808,663 A | * | 9/1998 | Okaya | 348/14.1 |
| 6,449,431 B1 | * | 9/2002 | Cuddeback et al. | 396/27 |
| 7,321,303 B2 | * | 1/2008 | Chen | 340/541 |
| 7,471,334 B1 | * | 12/2008 | Stenger | 348/373 |
| 2007/0025714 A1 | * | 2/2007 | Shiraki | 396/72 |
| 2007/0139529 A1 | * | 6/2007 | Levien et al. | 348/220.1 |
| 2008/0225120 A1 | * | 9/2008 | Stuecker | 348/155 |
| 2008/0297587 A1 | * | 12/2008 | Kurtz et al. | 348/14.08 |
| 2010/0134604 A1 | * | 6/2010 | Kieffer et al. | 348/61 |

* cited by examiner

*Primary Examiner* — Hung Lam
(74) *Attorney, Agent, or Firm* — Jerry D. Haynes; Law Office of Jerry D. Haynes

(57) ABSTRACT

The present invention relates to a camera device for outdoor photography and a method to capture wildlife photographs. The camera device comprises: a four sided block; a solar panel on the top side of the block, where the solar panel supplies power to the camera device; a camera lens on each side of the block; a sensor on each side of the block, where the sensor detects motion and activates the camera lens associated with said sensor; and a programming panel on each side of the block, where the programming panel may program the functionality of each camera and sensor. The camera device also includes adequate memory and a processor, where the memory stores photographs taken by each camera and the processor executes commands related to the functionality of each camera and sensor of the camera device.

5 Claims, 1 Drawing Sheet

FOUR-SIDED PHOTOGRAPHY CAMERA

BACKGROUND OF THE INVENTION

1. Field of Invention

The present invention relates to a solar powered four-sided camera used to photograph wildlife.

2. Description of Related Art

Photography involves the process of creating still and moving images through the use of film or electronic digital cameras. Photography may involve varying degrees of expertise and complexity varying from point shoot cameras to complex SLR cameras that allow the photographer to control settings relating to the camera and exposure such as aperture, speed and focus. Various areas of photography exist that include photojournalism, fashion photography, fine art photography, glamour photography, weddings, sports photography, still life, nature and wildlife photography. Depending on the environment, a photographer may need special lighting, flash accessories, shading, tripods or other related photography equipment in order to create the desired image.

With respect to the area of wildlife photography, many times a photographer must remain positioned in one location for several hours in order to obtain the desired shot due to the random nature of wildlife, weather conditions and other uncontrollable circumstances associated with wildlife photography. The wildlife photographer may also need various types of focal lens in order to zoom in on the desired image and often times must be hidden from sight from the wildlife in order to capture the image in a natural state. The photographer must also have a good idea of the animal's behavior in order to predict certain actions and certain instances where the wildlife may be visible for photography. On occasion some cameras may be operated remotely or automatically in an outdoor environment for the opportunity to control the photography as desired. Consequently, it would be advantageous to have a remotely controlled camera which may be positioned for likely wildlife activity. Such a camera could capture wildlife in its natural habitat and therefore provide the desired images. Once the images are taken, it would be advantageous to transmit the images for viewing by the remotely located photographer.

SUMMARY OF THE INVENTION

The present invention relates to a camera device for outdoor photography and a method to capture wildlife photographs. The camera device comprises: a four sided block; a solar panel on the top side of the block, where the solar panel provides a means to supply power to the camera device; a camera lens on each side of the block; a sensor on each side of the block, where the sensor provides a means to detect motion and activate the camera lens associated with said sensor; and a programming panel on each side of the block, where the programming panel provides a means to program the functionality of each camera and sensor. In one particular embodiment, the camera device may further include a flash on each side of the block. The camera device also includes adequate memory and a processor, where the memory provides a means to store photographs taken by each camera and the processor executes commands related to the functionality of each camera and sensor of the camera device. The camera device according to the present invention also includes a wireless communication means to transmit photographs to a remote location via the Internet.

DETAILED DESCRIPTION

The present invention relates to a four-sided, quad camera that may be positioned outdoors to record and capture photographs through a remote monitoring system. The quad camera according to the present invention includes cameras on each side of a four-sided cube or block. Each separate camera may capture images in the direction of the particular side of the camera. The present invention therefore enables essentially a 360-degree view in one device that may be operated remotely through sensors provided in the camera and photographs taken by the camera may be transmitted by the remote user via the Internet.

Figure 1:
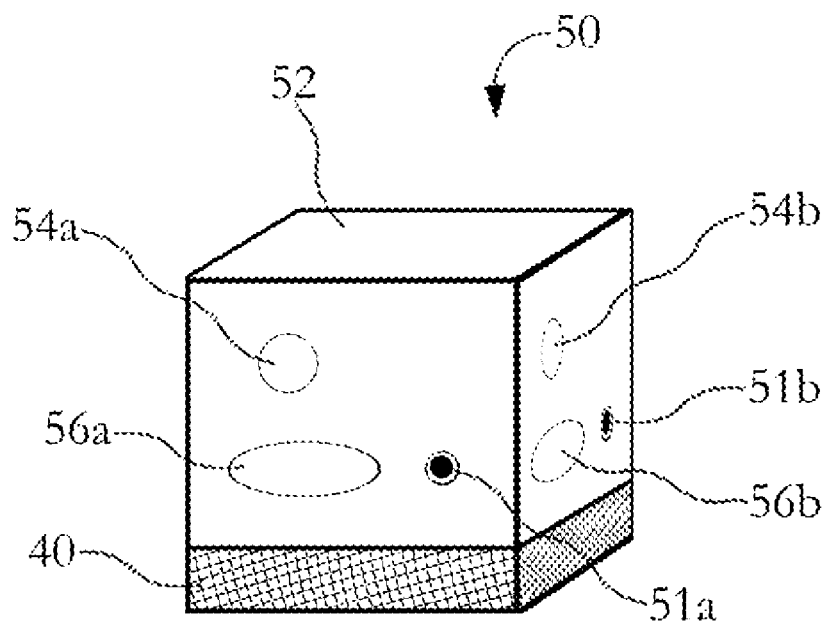
FIG. 1 depicts a four-sided, quad camera according to the present invention.

The four-sided quad camera 50 is depicted in FIG. 1. The four-side camera 50 includes a solar panel 52 on the top side of the substantially square block, which encompasses the four cameras. Each of the four sides of the square block includes a lens 51*a*, 51*b* for each camera, which is depicted in FIG. 1. In addition to the camera lens 51 each side of the quad camera has a flash 54*a*, 54*b*. In addition to a flash 54, each side includes a sensor 56*a*, 56*b* where the sensors detect motion associated with potential wildlife that may be the subject of the desired images. Each side includes a removal panel 40 for programming the functionality related to the camera, flash and sensors provided with each side of the quad camera 50. The two remaining sides of the quad camera 50 are not shown but are substantially similar to the sides shown in FIG. 1. Internally the camera 50 may include memory and a processor to process the functionality associated with the camera 50.

The quad camera 50 receives solar power via a solar panel 52 and may be placed in a natural setting so that it may be operated for hours or days on end in order to capture images. Each camera of the quad camera 50 may be programmed with specific features and focusing parameters. The sensors 56 provide a means to activate the camera when motion or movement is detected that may be an indication of the desired wildlife that the photographer is attempting to capture. The quad camera 50 also includes wireless communication technology to transmit photographs taken by the camera to a remote user via a wireless connection to the Internet. A user of the quad camera 50 may retrieve these photos on a web site or the photos may be transmitted to the user's email account.

Figure 2:
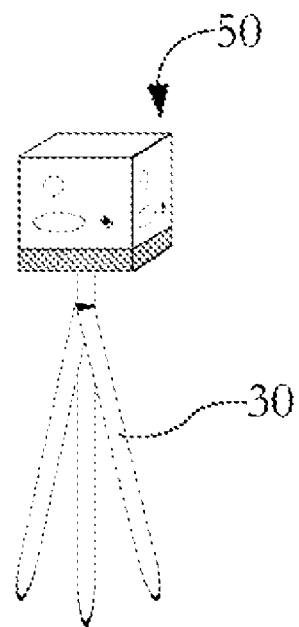
FIG. 2 depicts the quad camera according to the present invention positioned on a tripod.

FIG. 2 depicts the quad camera 50 on a tripod 30 and therefore demonstrates the preferred embodiment of the quad camera 50. The camera 50 includes a mounting means to attach and mount the camera 50 on the tripod 30. The camera 50 also may be camouflaged in a manner so that the quad camera 50 may be hidden from sight and not be visible to wildlife. Other features on the quad camera 50 may include an anti-theft system so that a remote user will be notified if the quad camera 50 was removed from the location. The quad camera 50 enables a photographer to capture photographs over an extended period of time without the necessity of returning to the location to replace batteries and the camera, or to reposition it. The quad camera 50 captures images and then transmits them instantly to the remote user thereof. The quad camera 50 therefore enables a photographer to take wildlife photographs over a substantial period of time and to receive the resulting photographs instantaneously. The quad camera 50 may also be a waterproof camera and enabled to withstand environmental conditions that are associated with the use thereof.

What is claimed is:

1. A camera device for outdoor photography comprising:
   a. a four sided block;
   b. a solar panel on the top side of the block, where the solar panel provides a means to supply power to the camera device;
   c. four cameras within the four sided block, where the four cameras enable the camera device to have a 360-degree view;
   d. a camera lens for each of the four cameras on each side of the block;
   e. a flash for each of the four cameras on each side of the block;
   f. a sensor for each of the four cameras on each side of the block, where the sensor provides a means to detect motion and activate the camera lens associated with said sensor;
   g. a programming panel for each of the four cameras on each side of the block, where the programming panel provides a means to program the functionality of each camera and sensor;
   h. a means to waterproof said camera device and enable the camera device to withstand various environmental conditions and
   i. a mounting means, where said mounting means enables the camera device to be mounted on a tripod.

2. The camera device according to claim 1, further comprising memory and a processor where the memory provides a means to store photographs taken by each camera and the processor executes commands related to the functionality of each camera and sensor of the camera device.

3. The camera device according to claim 1, further comprises a wireless communication means to transmit photographs to a remote location via the Internet.

4. The camera device according to claim 1, further including a means to camouflage said camera device.

5. The camera device according to claim 1, further including an anti-theft system to detect the movement of the camera device from a specified location.

* * * * *